July 28, 1942.   J. L. DENTON   2,291,454
ANIMAL WEANER
Filed April 2, 1940
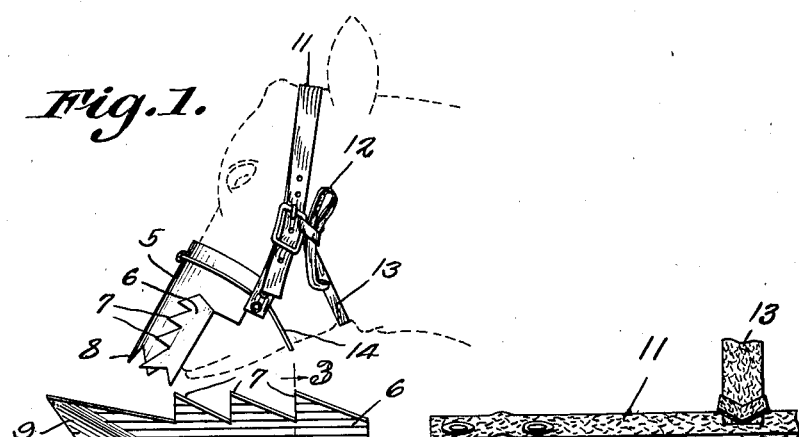
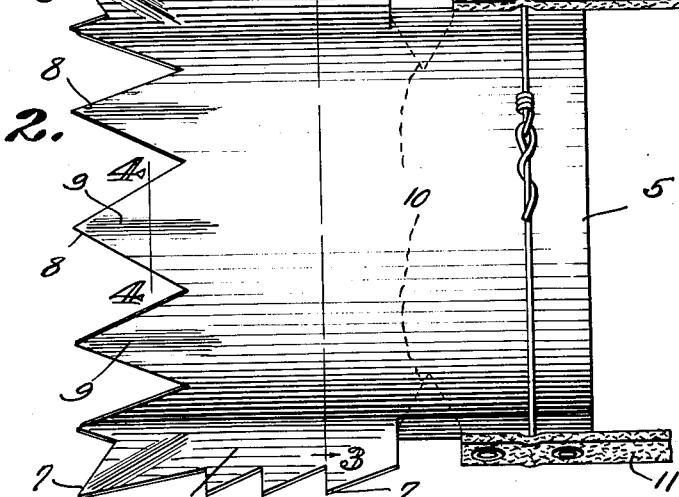
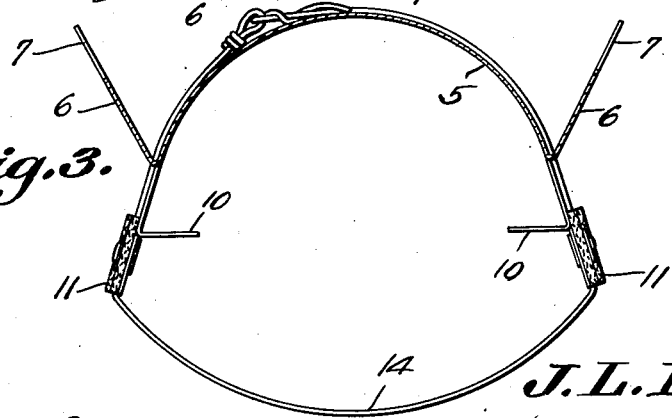
J. L. Denton
INVENTOR.
BY C. H. Knowles
ATTORNEYS.

Patented July 28, 1942

2,291,454

UNITED STATES PATENT OFFICE 2,291,454

ANIMAL WEANER

John L. Denton, Whitewright, Tex.

Application April 2, 1940, Serial No. 327,503

2 Claims. (Cl. 119—130)

This invention relates to animal weaners, the primary object of the invention being to provide a weaner comprising a head stall having prongs or projecting points formed thereon, to pierce the animals causing pain to discourage feeding from the mother animal.

An important object of the invention is to provide a weaner of this character, constructed in such a manner that it will swing upwardly by contact with the ground surface, allowing the animal wearing the weaner, to graze without interference.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a view illustrating the animal weaner as applied to the head of an animal.

Figure 2 is a plan view thereof.

Figure 3 is a sectional view taken on line 3—3 of Figure 2.

Figure 4 is a sectional view taken on the line 4—4 of Figure 2.

Referring to the drawing in detail, the weaner comprises a body portion 5 constructed preferably of sheet metal material and curved, as clearly shown by Figure 1 of the drawing, to fit over the face and nose of the animal wearing the weaner.

In constructing the body portion, the side edges of the body portion are cut inwardly from a point substantially intermediate the ends of the body portion, the portions 6 of the body portion being bent upwardly and outwardly. The upper edges of the portions 6 are formed with prongs or projecting points 7 disposed throughout the lengths of the members 6, which are disposed on opposite sides of the body portion. As shown by Figure 1 of the drawing, these prongs or projecting points extend forwardly to pierce the animal with which they contact, when the head of the animal wearing the weaner, is moved upwardly.

Formed throughout the length of the forward end of the body portion, are prongs or projecting points 8 which will also pierce the animal with which they engage, when the head of the animal wearing the weaner is moved upwardly in feeding from its mother.

As clearly shown by Figure 4 of the drawing, the prongs or projecting points are bent upwardly at points intermediate their side edges as at 9, strengthening the prongs or projecting points to prevent bending thereof, should the prongs or projecting points be brought into contact with a stationary object.

Struck inwardly from the body portion, at points adjacent to the inner end thereof, are prongs 10. These prongs 10 are of lengths so that they will not contact with the sides of the face of the animal wearing the weaner, unless pressure from the side, is directed to the weaner, caused by the prongs at the sides of the body portion contacting with an object. These prongs 10, piercing the jaws of the animal wearing the weaner, will discourage the feeding of the animal from its mother.

A head strap indicated at 11 has one of its ends secured at one end of the body portion, the opposite end of the strap passing through the buckle 12 which is secured to the body portion at the opposite side thereof. Due to this construction, the weaner may be readily adjusted and properly secured to the head of the animal.

A throat strap indicated at 13 is secured to the head strap 11, and is adapted to be tied to the buckle 12, in a manner as shown by Figure 1, thereby securely fastening the weaner in position.

To further secure the weaner on the head of an animal, but at the same time permit the weaner to swing upwardly out of the way when the animal is grazing, a wire indicated at 14 is secured to the body portion of the weaner, and passes under the jaw of the animal.

What is claimed is:

1. An animal weaner comprising a body portion constructed of sheet metal material, the body portion being transversely curved and adapted to fit over the nose and face of an animal, the sides of the body portion being extended outwardly and adapted to normally lie in spaced relation with the sides of the face of the animal wearing the weaner, outwardly extended prongs formed along the front and side edges of the body portion, prongs extending inwardly from the side edges of the body portion and adapted to normally lie in spaced relation with the face of the animal wearing the weaner, said latter prongs adapted to engage the face of the animal, only when lateral pressure is directed to the weaner, and means for securing the weaner on the head of an animal.

2. An animal weaner comprising a body portion constructed of sheet metal material, the body portion being transversely curved and adapted to fit over the nose and face of an animal, the side edges of the body portion being extended outwardly, portions of the side edges of the body portion extending upwardly, prongs formed along the upwardly extended edges of the sides of the body portion, prongs extending forwardly from the front edge of the body portion, prongs extending inwardly from the side edges of the body portion, the latter prongs normally lying in spaced relation with the face of the animal wearing the weaner, the inwardly extended prongs adapted to engage the face of the animal only when lateral pressure is directed to the weaner, and means for securing the weaner on the head of an animal.

JOHN L. DENTON.